3,248,385
ETHYLENIMMONIUM SALTS
Dale N. Kinsey, Pasadena, Tex., Frederick R. Jensen, Orinda, Calif., and John H. Hennes, Newport News, Va., assignors to The Dow Chemical Company, Midland, Mich., a corporation of Delaware
No Drawing. Filed Apr. 8, 1964, Ser. No. 358,362
2 Claims. (Cl. 260—239)

This application is a continuation-in-part of our copending application Serial No. 171,579, filed February 7, 1962, and now abandoned.

This invention relates to stable salts of ethylenimine (aziridine) and its homologs and to processes for making such salts.

Ethylenimine is an extremely reactive compound which would find wide commercial use as a chemical intermediate were it not for certain difficulties encountered in in storage, handling and utilization. Thus, it is chemically unstable, highly volatile, very irritating to animal tissues, extremely toxic to animals, and highly inflammable. These properties constitute a tremendous handicap to the practical large-scale use of the compound. To a large degree the same properties are found in the homologs of ethylenimine, such as 1,2-propylenimine, 1,2- and 2,3- butylenimine, and the like.

It is an object of the present invention to provide chemical equivalents of ethylenimine and its homologs which are stable crystalline solids having low volatility, low toxicity and low flammability and which are substantially non-irritating to animal tissues. Another object is to provide solid, stable salts of ethylenimine which can be used directly as a substitute for the free amine in many reactions used in making aminoalkylated compounds. Another object is to provide methods for making such products. Other objects will appear hereinafter.

According to the invention, certain salts of ethylenimine and its homologs can be prepared in non-aqueous inert solvents, which salts are stable, crystalline, non-volatile materials having much diminished irritant and toxic properties as compared to the free imines, and from which the free imines can easily be recovered by simply reacting the salts with an alkali. For many uses as a chemical intermediate the salts can be used directly, without regeneration of the free amine.

The ethylenimine salts of the invention are those of sulfuric acid; i.e., the normal sulfate and the bisulfate (acid sulfate).

Since ethylenimine and its lower alkyl homologs are easily hydrolyzed by water in the presence of acids, the salts of the invention must be prepared in a substantially non-aqueous inert solvent. Preferably, the solvent should be one in which the salt is only slightly soluble. In such solvents the salt crystallizes as rapidly as it is formed and its separation from the solvent is facilitated. Suitable solvents include diethyl ether, other dialkyl ethers, tertiary aliphatic alcohols, tetrahydrofuran, benzene, and the like.

Since the salts are sensitive to heat, they should be made and stored at temperatures below their decomposition points. In general, it is preferred that the temperature at which the process of the invention is conducted be below about 50° C., and desirably below about 40° C. Lower temperatures, as low as —30° C., are suitable, though there is little or no advantage in operating below about 0° C.

The practice of the invention is illustrated by the following examples.

Example 1.—Ethylenimmonium bisulfate

An ethereal solution of ethylenimine, 43 grams (1 mole) in 250 ml. of ether, was slowly added under anhydrous conditions to a stirred solution of 107.8 grams of sulfuric acid in 750 ml. of ether. The reaction temperature was kept below 10° C. throughout the addition, which required 75 minutes. Stirring was continued as the temperature was permitted to rise to room temperature. The reaction mixture was filtered under anhydrous conditions and the colorless crystals dried in a vacuum desiccator. Yield 127.5 grams, 90.5 percent. Melting point 90.5–91° C.

Analysis.—Calcd. for $C_2H_7NO_4S$: C, 17.03; H, 5.00; N, 9.93; S, 22.7. Found: C, 17.39; H, 5.06; N, 10.02; S, 23.2.

Example 2.—Ethylenimmonium sulfate

Sulfuric acid, 49 grams (0.5 mole), was dissolved in 500 ml. of anhydrous ether and cooled to 0° C. A solution of ethylenimine, 47.3 grams (1.1 mole) in 200 ml. of ether was added slowly with stirring, while the temperature was kept below 10° C. The reaction mixture was allowed to warm up to room temperature. Yield 90.9 grams, 98.7 percent. Melting point 61–65° C.

Example 3.—Propylenimmonium bisulfate 100 grams of sulfuric acid was mixed with 300 ml. of diethyl ether and cooled to 0° C. 57 grams of propylenimine were mixed with 200 ml. of diethyl ether and added slowly, with stirring, to the sulfuric acid solution, keeping the temperature below 10° C. The reaction mixture was allowed to warm to room temperature, the ether removed and the clear liquid product dried under vacuum. 87.1 grams of product remained, 94.5 percent yield.

Example 4.—Ethylenimmonium sulfate
(low temp. example)

An ethereal solution of 49 grams of sulfuric acid was added slowly, with stirring, to 47.3 grams of ethylenimine in one liter of diethyl ether, keeping the temperature below —15° C. The reaction mixture was allowed to warm to room temperature after which the white crystalline product was filtered out, washed with fresh ether and dried under vacuum. 87.1 grams of product remained, 94.5 percent yield.

Example 5.—Ethylenimmonium bisulfate
(reversed addition)

43 grams of ethylenimine in 250 ml. of ether was slowly added under anhydrous conditions to a stirred solution of 107.8 grams of sulfuric acid in 750 ml. of ether. The reaction temperature was kept below —15° C. throughout the addition, which required 55 minutes. Stirring was continued as the temperature was allowed to rise to room temperature. The reaction mixture was filtered under anhydrous conditions and the white crystals dried in a vacuum desiccator. Yield 139 grams, 98.8 percent.

Example 6.—Ethylenimmonium bisulfate
(high temp. example)

43 grams of ethylenimine in 250 ml. of ether was added slowly under anhydrous conditions to a stirred solution of 107.8 grams of sulfuric acid in 750 ml. of ether. The reaction temperature was allowed to fluctuate between 25–30° C. throughout the addition. The reaction mixture was filtered under anhydrous conditions and the white crystals dried in a vacuum desiccator. Yield, 132 grams, 93.6 percent.

The salts of the invention are useful not only as a convenient form of, or source of, the free alkylenimines but are also useful per se as chemical intermediates. Thus, they readily react with alcohols, phenols, amines and other compounds containing an active hydrogen to form the corresponding aminoalkyl or polyalkylenepolyamino derivative. As an example, methanol reacts with an ethylenimmonium salt to produce 2-methoxyethylamine.

While a variety of other alkylenimines can be used in the process of the invention to make the various salts thereof, a preferred class is that corresponding to the formula

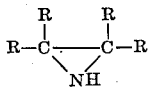

wherein each R may be H or lower alkyl, i.e., an unsubstituted alkyl radical containing 1 to 4 carbon atoms. When at least three of the R's are H the aziridine ring is particularly unstable and the process of the invention is particularly advantageous.

The salts of the imines corresponding to the above formula can be represented by the formula

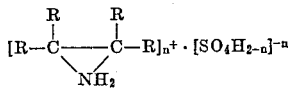

wherein R is as above defined and $n$ is an integer from 1 to 2, being 1 in the bisulfate and 2 in the normal sulfate.

We claim:
1. Ethylenimmonium bisulfate.
2. Propylenimmonium bisulfate.

References Cited by the Examiner
FOREIGN PATENTS
847,205  9/1960  Great Britain.

OTHER REFERENCES

Elderfield: Heterocyclic Compounds, vol. 1 (New York, 1950), pages 61 and 62 and 68.

Gabriel: Ber. Deut. Chem., vol. 21, pages 1049–1057 (1888).

Landenburg et al.: Ber. Deut. Chem., vol. 21, pages 758–766 (1888).

Schatz et al.: J. Am. Chem. Soc., vol. 77, pages 5113–5118 (1955).

NICHOLAS S. RIZZO, *Primary Examiner.*

ALTON D. ROLLINS, *Assistant Examiner.*